(12) United States Patent
Sampath et al.

(10) Patent No.: US 8,401,111 B2
(45) Date of Patent: Mar. 19, 2013

(54) METHOD AND APPARATUS FOR SEQUENCING AND CORRELATING A POSITIONING REFERENCE SIGNAL

(75) Inventors: Ashwin Sampath, Skillman, NJ (US); Ravi Palanki, San Diego, CA (US); Aamod D. Khandekar, San Diego, CA (US); Raja Sekhar Bachu, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 12/722,395

(22) Filed: Mar. 11, 2010

(65) Prior Publication Data

US 2010/0232543 A1 Sep. 16, 2010

Related U.S. Application Data

(60) Provisional application No. 61/160,197, filed on Mar. 13, 2009, provisional application No. 61/160,609, filed on Mar. 16, 2009, provisional application No. 61/173,154, filed on Apr. 27, 2009.

(51) Int. Cl.
*H04L 27/00* (2006.01)
(52) U.S. Cl. .................................... 375/295
(58) Field of Classification Search .................... 375/295
See application file for complete search history.

(56) References Cited

U.S. PATENT DOCUMENTS

| | | | |
|---|---|---|---|
| 6,771,622 B1 * | 8/2004 | Banerjee ..................... | 370/331 |
| 2004/0071200 A1 * | 4/2004 | Betz et al. ................... | 375/152 |
| 2006/0028976 A1 | 2/2006 | Park et al. | |
| 2011/0044159 A1 * | 2/2011 | Kishiyama et al. .......... | 370/208 |

OTHER PUBLICATIONS

3GPP: "3GPP TS 36.211 V8.6.0 Evolved Universal Terrestrial Radio Access (E-UTRA);Physicai Channels and Modulation (Release 8)" 3rd Generation Partnership Project (3GPP); Technicalspecification (TS), XX, XX, [Online] No. TS 36.211 V8.6.0, Mar. 1, 2009, pp. 1-83, XP002564072Retrieved from the Internet:URL:http://www.3gpp.org/ftp/Specs/html-info/36211.htm [retrieved on Jan. 19, 2010.
Ericsson: "Recapitulation of the IPDL positioning method" 3GPP Draft; RI-99346, 3rd Generation Partnership Project (3GPP), Mobile Competence Centre ; 650, Route Des Lucioles ; F-06921 Sophia-Antipolis Cedex ; France, vol. RAN WGI, No. Yokohama, Japan; May 12, 1999, XP050088492 [retrieved on May 12, 1999] paragraph [0002].
International Search Report and Written Opinion—PCT/U S2010/027233, International Search Authority—European Patent Office—Jul. 27, 2020.
Qualcomm Europe: "On OTDOA in LTE"3GPP Draft; R1-090353, 3rd Generation Partnership Project (3GPP), Mobile Competence Centre ; 650, Route Des Lucioles ; F-06921 Sophia-Antipolis Cedex ; France, No. Ljubljana; Jan. 8, 2009, XP050318259 [retrieved on Jan. 8, 2009].

(Continued)

*Primary Examiner* — Juan A Torres
(74) *Attorney, Agent, or Firm* — Kenneth Vu

(57) ABSTRACT

Aspects are disclosed for sequencing and correlating a positioning reference signal. A set of reference symbols associated with a reference signal are allocated, and a base sequence is generated. An extended sequence, which includes the set of reference symbols, is then provided according to the base sequence. The extended sequence is then transmitted in a sub-frame designated as an idle period. A sequence of reference symbols is received from a base station during an idle period of the base station. A replicated sequence of reference symbols is generated, and a correlation is ascertained between a subset of the received sequence of reference symbols and a corresponding subset of the replicated sequence of reference symbols. The received sequence of reference symbols is then identified according to the correlation.

28 Claims, 14 Drawing Sheets

OTHER PUBLICATIONS

Qualcomm Europe: "PHY layer specification impact of positioning improvements" SGPP Draft; RI-090852—PHY Layer Specification Impact of Positioning Improvements, SRD Generation Partnership Project (SGPP), Mobile Competence Centre ; 650, Route Des Lucioles ; F-06921 Sophia-Antipolis Cedex ; France, No. Athens, Greece; Feb. 3, 2009, XP050318705 [retrieved on Feb. 3, 2009] paragraph [0003].

Universal Mobile Telecommunications System (UMTS); User Equipment (UE) positioning in Universal Terrestrial Radio Access Network (UTRAN); Stage 2 (SGPP TS 25.305 version 8.1.0 Release 8); ETSI TS 125 305 ETSI Standard, European Telecommunications Standards Institute (ETSI), Sophia Antipolis Cedex, France, vol. 3-R2, No. V8.1.0, Jan. 1, 2009, XP014043153 paragraph [0009]-paragraph [09.1].

93GPP TSG-RAN WG1 #55bis, R1-090353, Title: On OTDOA in LTE, Source: Qualcomm Europe, Ljubljana, Slovenia, Jan. 12-19, 2009.

* cited by examiner

METHOD AND APPARATUS FOR SEQUENCING AND CORRELATING A POSITIONING REFERENCE SIGNAL

CROSS-REFERENCE TO RELATED APPLICATIONS

This application claims the benefit of U.S. Provisional Patent application Ser. No. 61/160,197 entitled "Enhanced Idle Period on Downlink Reference Signal Design," which was filed Mar. 13, 2009, U.S. Provisional Patent application Ser. No. 61/160,609 entitled "Enhanced Idle Period on Downlink Reference Signal Design," which was filed Mar. 16, 2009, and U.S. Provisional Patent application Ser. No. 61/173,154 entitled "Enhanced Idle Period on Downlink Reference Signal Design," which was filed Apr. 27, 2009. The aforementioned applications are herein incorporated by reference in their entirety.

BACKGROUND

I. Field

The following description relates generally to wireless communications, and more particularly to methods and apparatuses for sequencing and correlating positioning reference signals.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

For many applications it is often desirable to ascertain the location of a mobile device (e.g., user equipment) in a wireless communication system. To this end, trilateration-based downlink positioning techniques can be employed to identify such location. For instance, mechanisms such as Observed Time Difference of Arrival (OTDOA) in Universal Mobile Telecommunications System (UMTS) Terrestrial Radio Access Networks (UTRAN), Enhanced Observed Time Difference (E-OTD) in GSM (Global System for Mobile) EDGE (Enhanced Data Rates for GSM Evolution) Radio Access Network (GERAN), and Advanced Forward Link Trilateration (AFLT) in CDMA2000 can be utilized to locate a mobile device. For example, OTDOA measurements for a pair of downlink transmissions can describe a line of constant difference (e.g., a hyperbola) along which a mobile device can be located. The position of the mobile device can be identified by determining an intersection between lines of constant difference for at least two pairs of base stations.

A mobile device can estimate time of arrival (TOA) measurements for a set of neighboring cells through replica-based cross-correlation of physical signals transmitted by base stations. Reference signals occur frequently and possess high time-resolution capability. However, auto-correlation functions of reference signals are ambiguous due to time-domain repetition. Positioning performance improves with an increased number of reliable TOA measurements. In dense urban environments, however, a mobile device can reliably receive transmissions from only one or two base stations. Determining position can thus be difficult, which impacts location-based services and emergency call response. Accordingly, it would be desirable to develop a method and apparatus for improving positioning performance via low complexity correlation techniques.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with transmitting and receiving a low-complexity positioning reference signal. In one aspect, methods and computer program products are disclosed that facilitate sequencing a positioning reference signal. Within such embodiments, a set of reference symbols associated with a reference signal are allocated. For this embodiment, a base sequence is generated, wherein an extended sequence, which includes the set of reference symbols, is then provided according to the base sequence. The extended sequence is then transmitted in a sub-frame designated as an idle period.

In another aspect, an apparatus configured to facilitate sequencing a positioning reference signal is disclosed. Within such embodiment, the apparatus includes a processor configured to execute computer executable components stored in memory. The computer executable components include a reference symbol component, a sequence component, a signal generation component, and a communication component. The reference symbol component is configured to allocate a set of reference symbols associated with a reference signal, whereas the sequence component is configured to provide a base sequence. For this embodiment, the signal generation component is configured to generate an extended sequence according to the base sequence, wherein the extended sequence includes the set of reference symbols. The communication component is then configured to transmit the extended sequence in a sub-frame designated as an idle period.

In a further aspect, another apparatus configured to facilitate sequencing a positioning reference signal is disclosed. Within such embodiment, the apparatus includes means for retrieving, means for generating, means for providing, and means for communicating. For this embodiment, a set of reference symbols associated with a reference signal are retrieved, and a base sequence is generated. An extended sequence, which includes the set of reference symbols, is then provided according to the base sequence. The extended sequence is then communicated in a sub-frame designated as an idle period. In some aspects, the base sequence includes a first component real valued sequence and a second component real valued sequence. For these embodiments, the apparatus may further include means for concatenating the first component real valued sequence and the second component real valued sequence, and/or means for scrambling at least one of the first component real valued sequence or the second component real valued sequence.

In another aspect, methods and computer program products are disclosed that facilitate correlating a positioning reference signal. These embodiments include receiving a received sequence of reference symbols from a base station during an idle period of the base station. For these embodiments, a replicated sequence of reference symbols is generated, wherein a correlation is then ascertained between a subset of the received sequence of reference symbols and a corresponding subset of the replicated sequence of reference symbols. The received sequence of reference symbols is then identified and according to the correlation.

An apparatus configured to facilitate correlating a positioning reference signal is also disclosed. Within such embodiment, the apparatus includes a processor configured to execute computer executable components stored in memory. The computer executable components include a communication component, a replication component, a correlation component, and an identification component. The communication component is configured to receive a received sequence of reference symbols from a base station during an idle period of the base station, whereas the replication component is configured to model a replicated sequence of reference symbols. The correlation component is configured to determine a correlation between a subset of the received sequence of reference symbols and a corresponding subset of the replicated sequence of reference symbols. The identification component is then configured to categorize the received sequence of reference symbols according to the correlation.

In a further aspect, another apparatus configured to facilitate correlating a positioning reference signal is disclosed. Within such embodiment, the apparatus includes means for receiving, means for ascertaining, means for determining, and means for recognizing. For this embodiment, a received sequence of reference symbols is received from a base station during an idle period of the base station. A replicated sequence of reference symbols is then ascertained, and a correlation is determined between a subset of the received sequence of reference symbols and a corresponding subset of the replicated sequence of reference symbols. The received sequence of reference symbols is then recognized according to the correlation. In a further aspect, the apparatus may include means for obtaining a received transform set and a replicated transform set, wherein the correlation is based on a comparison between the received transform set and the replicated transform set. For this embodiment, the received transform set is associated with the subset of the received sequence, whereas the replicated transform set is associated with the corresponding subset of the replicated sequence.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
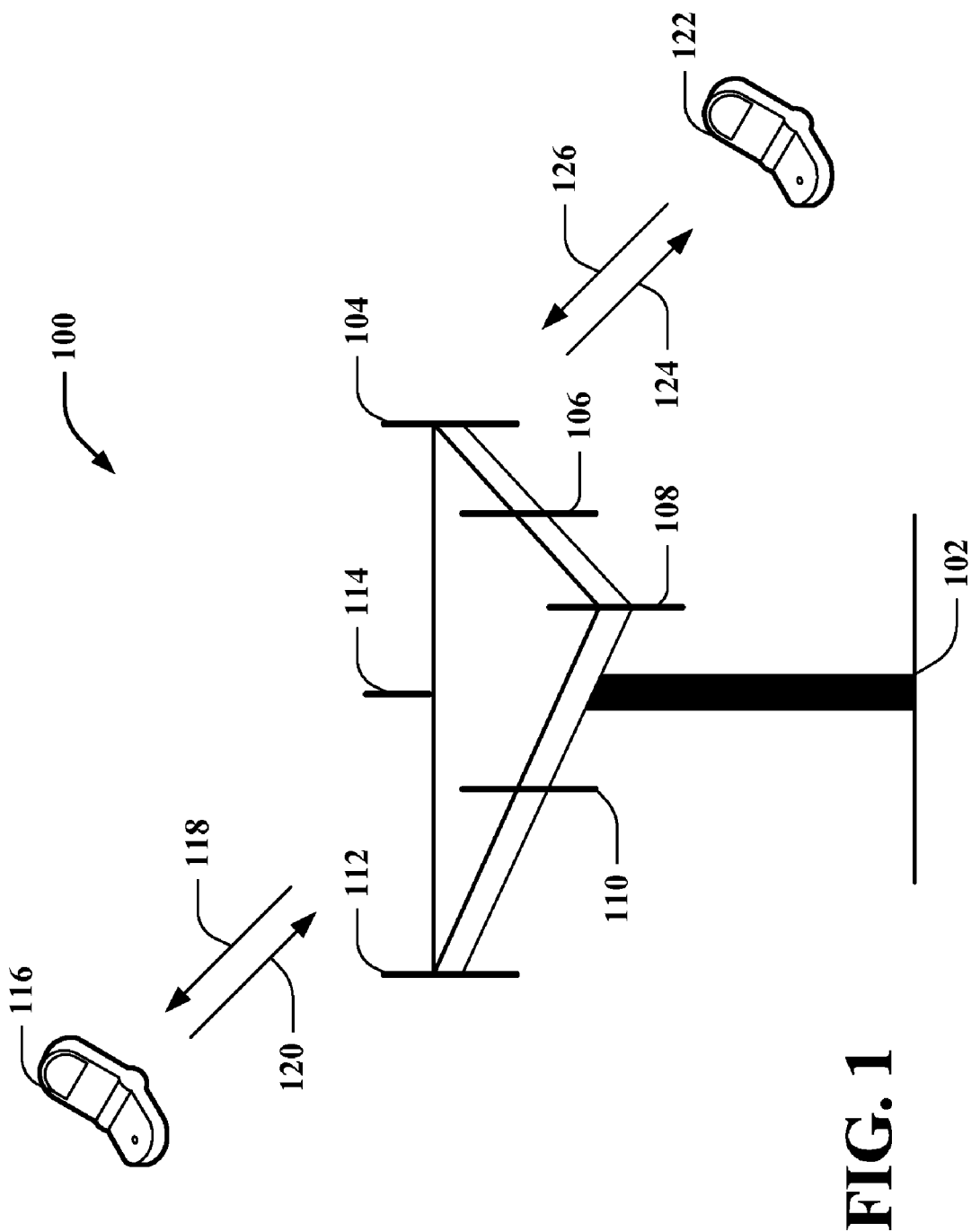
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification discloses a method and apparatus that facilitates sequencing and correlating positioning reference signals. In an aspect, such positioning reference signals can be utilized to detect neighbor cells with low geometries and/or to carry additional payload of a few bits of data. In addition, the positioning reference signal design described herein can be utilized to improve positioning performance in wireless communication systems. To this end, it is noted that wireless communication systems can provide Idle Periods in Downlink (IPDL) during which transmission of all channels from a base station cease. For instance, one slot every 100 milliseconds can be an idle period. The idle periods of a serving base station enable a mobile device to receive pilot signals from neighboring base stations. In addition, the mobile device can more accurately measure TOA of the serving base station during idle periods of a second best base station.

In LTE-based systems, enhanced IPDL (E-IPDL) can be employed. E-IPDL provides a sub-frame (e.g., an E-IPDL sub-frame) during which only cell-specific reference signals and E-IPDL reference signals (also known as "positioning reference signals") are transmitted by a base station. Positioning reference signals can be generated via a variety of mechanisms. In aspects disclosed herein, a design for a positioning reference signal is provided, wherein sequences which implement low complexity correlations are utilized (e.g., Walsh sequences, maximum length sequences, Zadoff-Chu sequences, etc).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
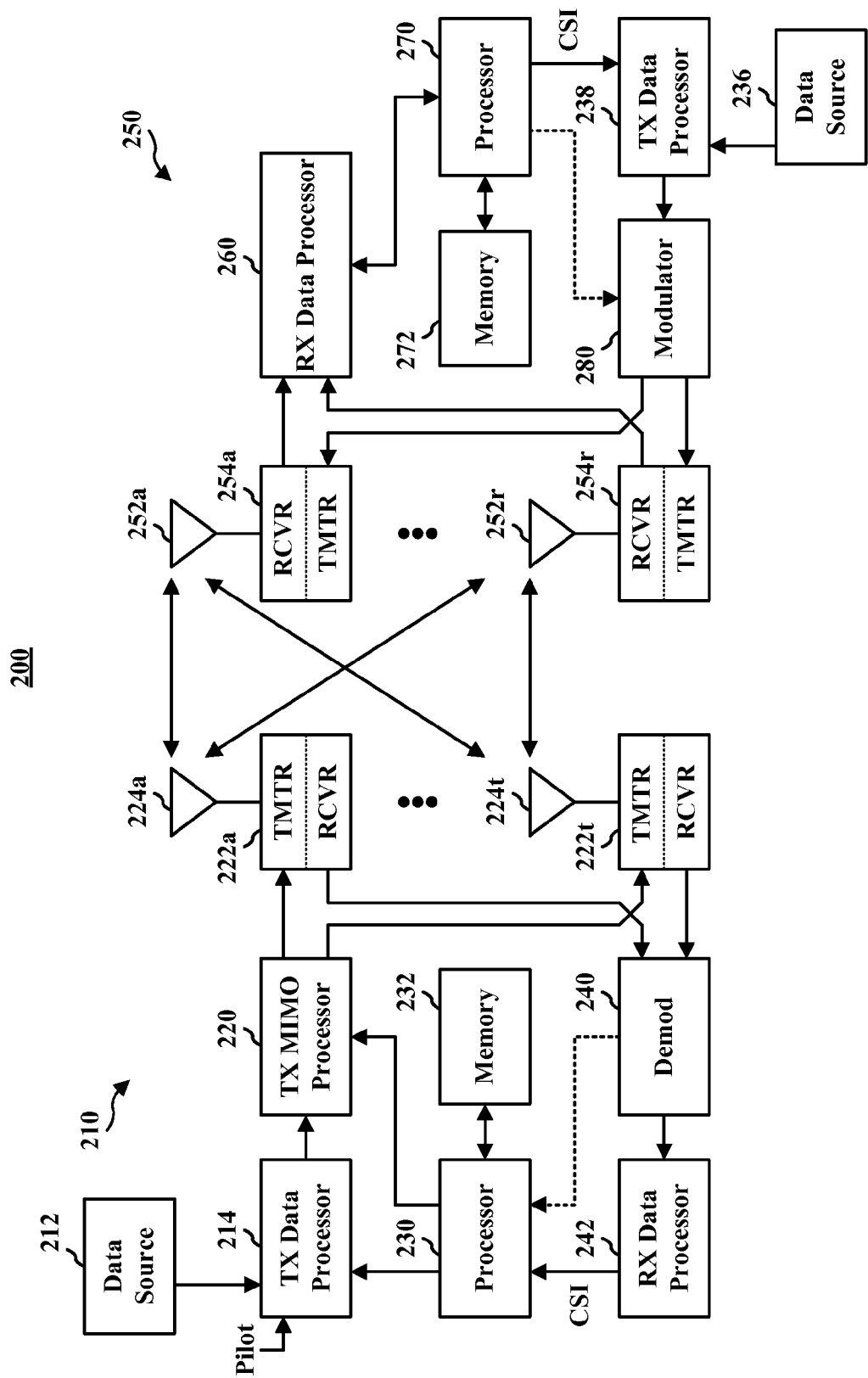
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
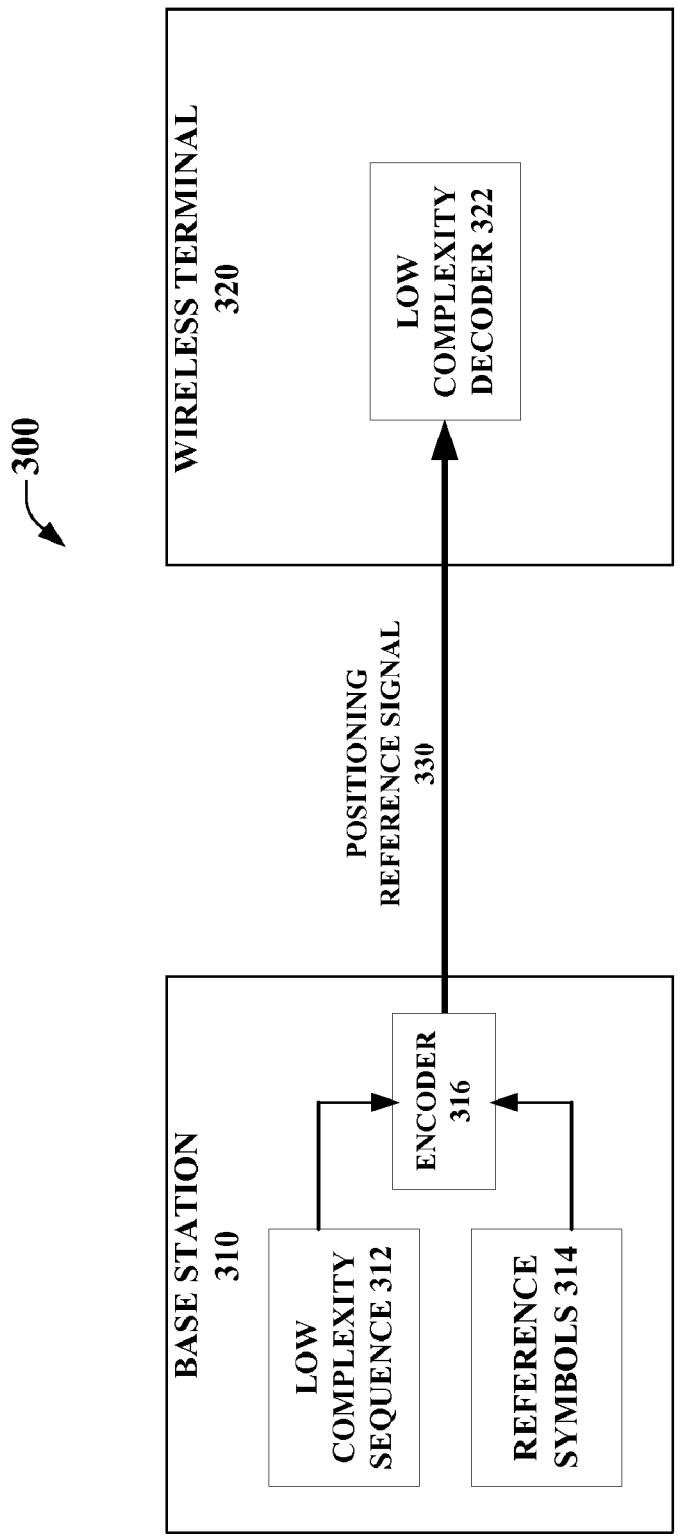
FIG. 3 is an overview of an exemplary system for sequencing and correlating positioning reference signals in accordance with an aspect of the subject specification.

Referring next to FIG. 3, an overview of an exemplary system for facilitating sequencing and correlating positioning reference signals in accordance with an aspect is provided. As illustrated, system 300 includes base station 310, which provides positioning reference signal 330 to wireless terminal 320. Within such embodiment, base station 310 encodes positioning reference signal 330 via encoder 316. In particular, each of a low complexity sequence 312 and a set of reference symbols 314 are input to encoder 316. Encoder 316 then encodes the set of reference symbols 314 according to low complexity sequence 312 to generate positioning reference signal 330, which is then decoded by low complexity decoder 322 in wireless terminal 320. In an aspect, positioning reference signal 330 is based upon a Walsh sequence or a maximum length sequence (e.g., an M-sequence) to facilitate E-IPDL operation in a wireless communication environment. Zadoff-Chu sequences or any other set of sequences with a low complexity correlation implementation, however, may also be used inter-changeably with Walsh/maximum length sequences.

In an aspect, base station 310 can generate N E-IPDL reference signal sequences, where N is an integer greater than or equal to one. For example, when the E-IPDL reference signal carries a physical cell identity (PCI) and a global cell identity (GCI), then N=504×2. For this particular embodiment, the number of sequences per frequency shift can be defined as M. For instance, if there are six possible frequency shifts for an E-IPDL reference signal, then M=[N/6]. In an aspect, the number of sequences per frequency shift M can thus be the next highest integer above the quotient between the required number of sequences N and the number of possible shifts. A minimum value, k, can then be found such that $M \leq 2^{2k}$.

In an aspect, $w_l$ may be used to represent the l-th sequence in a set of $L=2^k$ point Walsh/m sequences. Within such embodiment, base station 310 can generate a base sequence for a given frequency shift, wherein the i-th base sequence (of length L where i is an integer from 0 to L−1, inclusive) for a given frequency shift is given by:

$$b_i = w_m + j w_n$$

where m and n represent sequence indices defined as n=imodL and m=[i/L], and where $w_m$ and $w_n$ are component real valued sequences.

Base station 310 can also be configured to identify a total number of OFDM symbols, P, that carry positioning reference signal 330, as well as a total number of resource elements, Q. In an example, the total number of resource elements for a bandwidth of 110 resource blocks can be given by Q=220P. For this particular example, base station 310 can repeat the base sequence, b, to generate a sequence of length Q.

In an aspect, base station 310 may further include a block interleaver (not shown) that interleaves the sequence of length Q. Although a block interleaver is discussed herein, it should be appreciated that other suitable interleavers can be employed in place of a block interleaver (e.g., an interleaver can be defined for each OFDM symbol). In an aspect, the block interleaver can employ a P-row and 220-column block interleaver (e.g., column-wise writing followed by row-wise reading). Interleaving can ensure that every element in a base sequence is present in all possible bandwidths. In addition, interleaving can facilitate avoidance of repeated sequences in the frequency domain. It is to be appreciated that in situations where a number of OFDM symbols P evenly divides a base sequence length L, the block interleaver can select a number of rows that is greater than the number of symbols P that does not evenly divide the base sequence length L. The interleaved sequence is then incorporated into a sub-frame designated for E-IPDL in a frequency first and time next manner. Positioning reference signal 330 is then transmitted to one or more mobile devices, such as wireless terminal 320.

Once positioning reference signal 330 is received, wireless terminal 320 can utilize low-complexity decoder 322 to create an E-IPDL reference signal replica. In an aspect, low-complexity decoder 322 utilizes a mechanism substantially similar to the technique employed by base station 310. In a further aspect, low-complexity decoder 322 performs correlation operations that compare an obtained reference signal with a generated replica signal. For example, the l-th E-IPDL OFDM symbol corresponding to the i-th base sequence can be represented by $s_l^i$. For a particular time hypothesis, the correlation operation produces a time-domain correlation between the l-th OFDM symbol observation $y_l$ (e.g., an OFDM symbol received from base station 310 during the E-IPDL sub-frame), and a corresponding E-IPDL reference signal replica for the i-th sequence $s_l^i$. In an aspect, the time-domain correlation can be given by:

$$\langle y_l, s_l^i \rangle = \langle Fy_l, Fs_l^i \rangle$$

where F is a Fourier matrix.

Low-complexity decoder 322 can then ascertain a total correlation in accordance with the following:

$$\sum_{i=0}^{P-1} \langle y_1, s_1^i \rangle = \sum_{i=0}^{P-1} \langle Fy_1, Fs_1^i \rangle = \sum_{j=0}^{L-1} z_j b_i(j)$$

where $z_j$ represents a sum of all frequency observations with $b_i(j)$ as the coefficient. In an aspect, $b_i(j)$ is comprised of Walsh or m sequences, thus enabling correlations to be generated with low complexity. To this end, it should be further noted that Low-complexity decoder 322 can detect received sequences either with a subset of symbols or a subset of resource elements.

Figure 4:
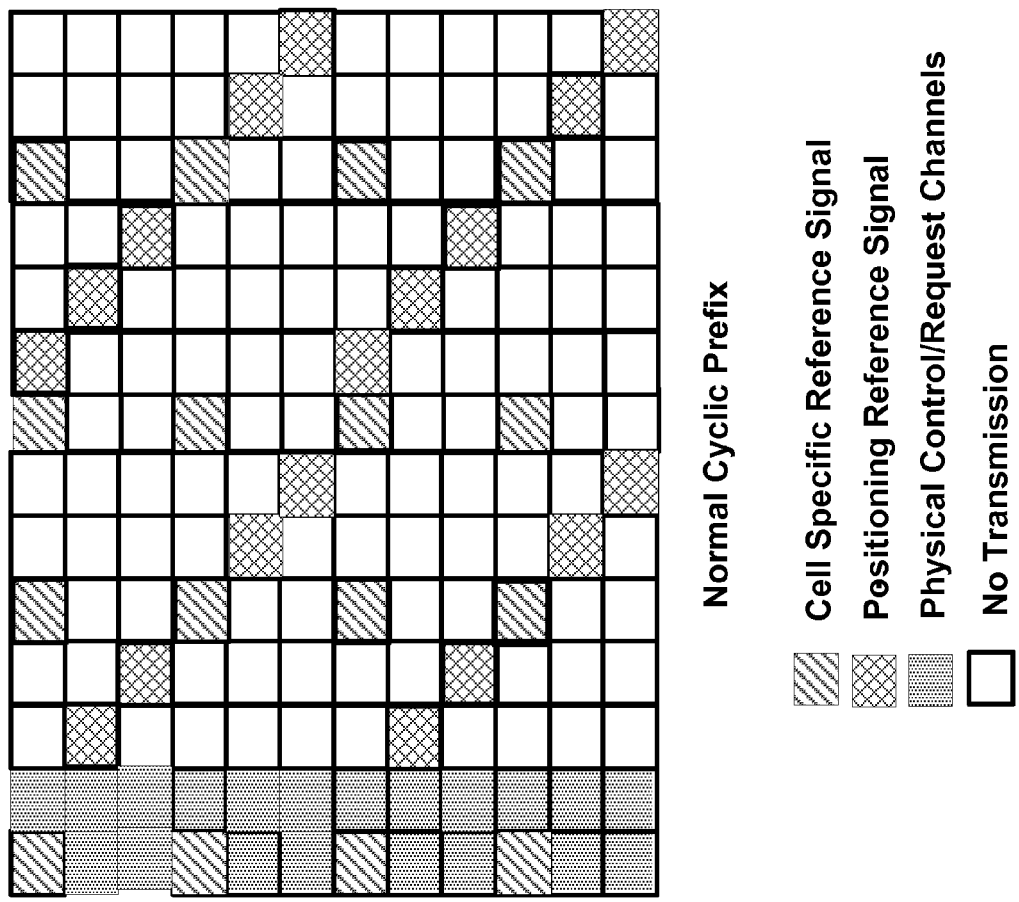
FIG. 4 illustrates an exemplary time-frequency region occupied by a positioning reference signal during a normal cyclic prefix mode in accordance with an embodiment.
Figure 5:
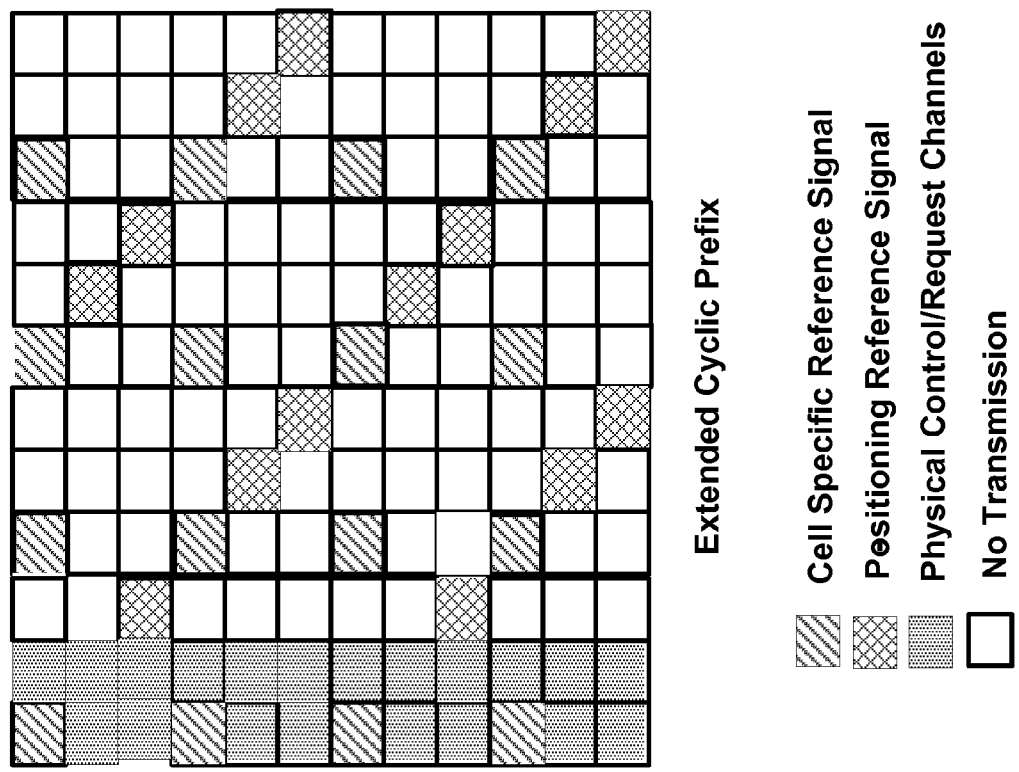
FIG. 5 illustrates an exemplary time-frequency region occupied by a positioning reference signal during an extended cyclic prefix mode in accordance with an embodiment.

Referring next to FIGS. 4-5, exemplary time-frequency regions occupied by a positioning reference signal (e.g., an E-IPDL reference signal) are shown. For this particular example, FIG. 4 illustrates an exemplary time-frequency region during a normal cyclic prefix mode, whereas FIG. 5 illustrates an exemplary time-frequency region during an extended cyclic prefix mode. Here, it is to be appreciated that a positioning reference signal as described herein can occupy any generic time-frequency region, wherein the examples illustrated in FIGS. 4-5 show a particular design similar to the cell-specific reference signal that exists currently in the LTE specification. It should be further appreciated that the Physical Control/Request Channels described in FIG. 4-5 can represent any of a plurality of channels including, for example, a Physical Downlink Control Channel (PDCCH), a Physical HARQ Indicator Channel (PHICH), or a Physical Control Format Indicator Channel (PCFICH).

Figure 6:
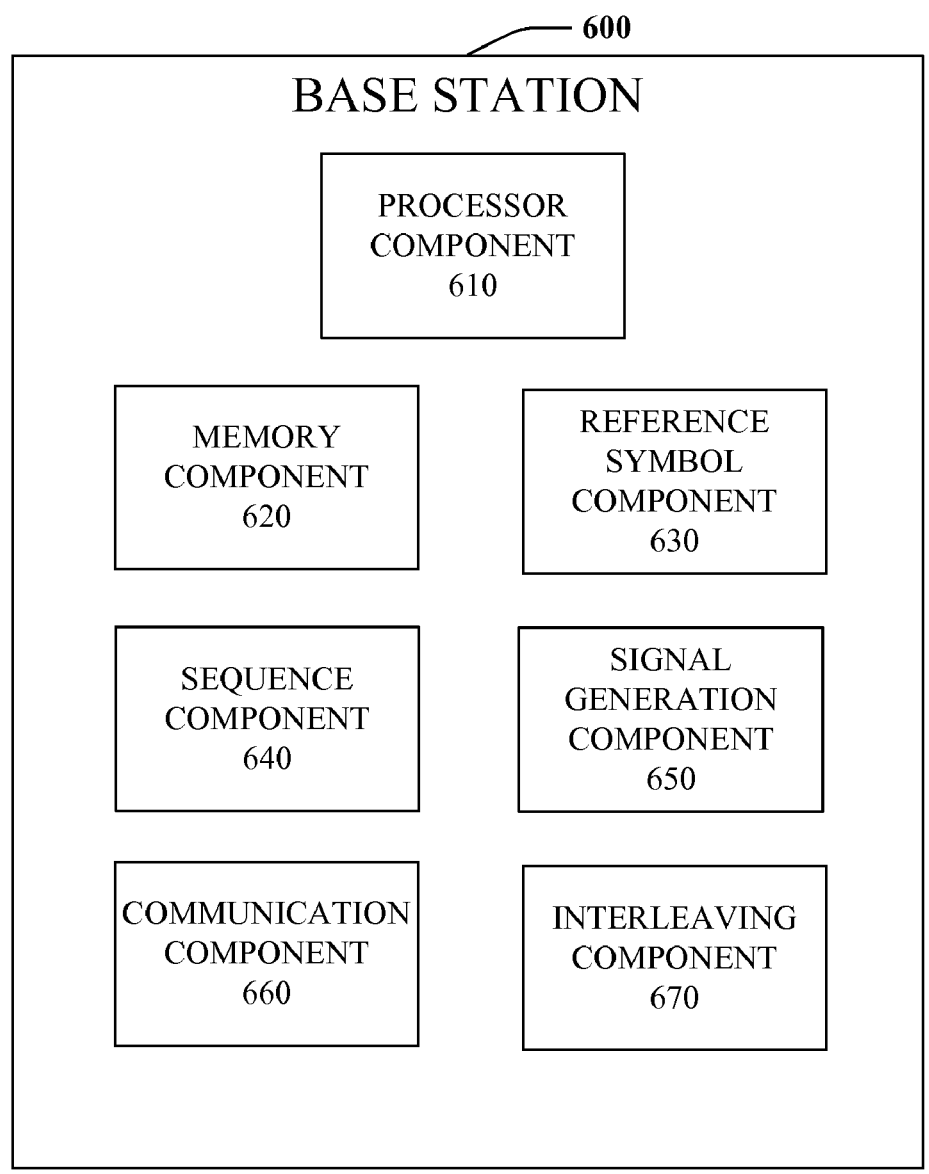
FIG. 6 illustrates a block diagram of an exemplary base station that facilitates sequencing positioning reference signals in accordance with an aspect of the subject specification.

Referring next to FIG. 6, a block diagram of an exemplary base station that facilitates sequencing a positioning reference signal according to an embodiment is provided. As shown, base station 600 may include processor component 610, memory component 620, reference symbol component 630, sequence component 640, signal generation component 650, communication component 660, and interleaving component 670.

In one aspect, processor component 610 is configured to execute computer-readable instructions related to performing any of a plurality of functions. Processor component 610 can be a single processor or a plurality of processors dedicated to analyzing information to be communicated from base station 600 and/or generating information that can be utilized by memory component 620, reference symbol component 630, sequence component 640, signal generation component 650, communication component 660, and/or interleaving component 670. Additionally or alternatively, processor component 610 may be configured to control one or more components of base station 600.

In another aspect, memory component 620 is coupled to processor component 610 and configured to store computer-readable instructions executed by processor component 610. Memory component 620 may also be configured to store any of a plurality of other types of data including data generated by any of reference symbol component 630, sequence component 640, signal generation component 650, communication component 660, and/or interleaving component 670. Memory component 620 can be configured in a number of different configurations, including as random access memory, battery-backed memory, hard disk, magnetic tape, etc. Various features can also be implemented upon memory component 620, such as compression and automatic back up (e.g., use of a Redundant Array of Independent Drives configuration).

In yet another aspect, communication component 660 is also coupled to processor component 610 and configured to interface base station 600 with external entities. For instance, communication component 660 may be configured to transmit an extended sequence of a reference signal in a sub-frame designated as an idle period. In a particular embodiment, the extended sequence is generated by repeating a base sequence provided by sequence component 640, wherein the particular sub-frame is defined by an enhanced idle period in downlink.

As illustrated, base station 600 may also include reference symbol component 630 and sequence component 640. Within such embodiment, reference symbol component 630 is configured to allocate a set of reference symbols associated with a reference signal, whereas sequence component 640 is configured to provide a base sequence utilized by signal generation component 650 to encode the allocated reference symbols.

Here, it should be noted that sequence component 640 may provide signal generation component 650 with any of a plurality of sequence types. For instance, the base sequence can be a Walsh sequence, a maximum length sequence, a Zadoff-Chu sequence, or any of several other low-complexity sequences. The base sequence can also be a time-domain sequence or a frequency-domain sequence.

It should be further noted that sequences provided by sequence component 640 may comprise various components. For example, in a particular embodiment, sequence component 640 generates a base sequence comprised of a first component real valued sequence and a second component real valued sequence. In another aspect, sequence component 640 generates a base sequence by concatenating the first component real valued sequence and the second component real valued sequence. Within such embodiment, each of the first component real valued sequence and the second component real valued sequence can be based on a secondary synchronization signal associated with a long term evolution system.

In another aspect, sequence component 640 is configured to perform a scrambling of at least one of the first component real valued sequence or the second component real valued sequence. For this embodiment, the scrambling can be performed in various ways. For example, the scrambling can be dependent on a frequency shift and/or the scrambling of one component can be dependent on the scrambling of the other (e.g., a first scrambling associated with the first component real valued sequence is dependent on a second scrambling associated with the second component real valued sequence). Here, it should also be noted that sequence component 640 can be configured to perform the scrambling by selecting a scrambling code from any of a plurality of candidate scrambling codes.

As illustrated, base station 600 may also include signal generation component 650. For this embodiment, signal generation component 650 is configured to generate an extended sequence according to the base sequence provided by sequence component 640, wherein the extended sequence includes the set of reference symbols allocated by reference symbol component 630. In a particular embodiment, signal generation component 650 is configured to generate the extended sequence by repeating the base sequence according to a number of reference symbols included in the set of reference symbols. In an aspect, a length of the base sequence is based on a frequency shift, wherein signal generation component 650 is configured to perform a partitioning operation according to the frequency shift. Moreover, for this particular embodiment, signal generation component 650 is configured to partition a set of available resource elements into a plurality of subsets according to the frequency shift.

Base station 600 may also include interleaving component 670. Within such embodiment, interleaving component 670 is coupled to signal generation component 650 and configured to interleave the extended sequence into a time-frequency region reserved for the reference signal. Here, it should be noted that interleaving component 670 may be provided in any of various implementations. For instance, interleaving component 670 may be configured to implement a block interleaver. In another embodiment, interleaving component 670 is configured to implement a plurality of interleavers respectively corresponding to individual reference symbols within the set of reference symbols.

Figure 7:
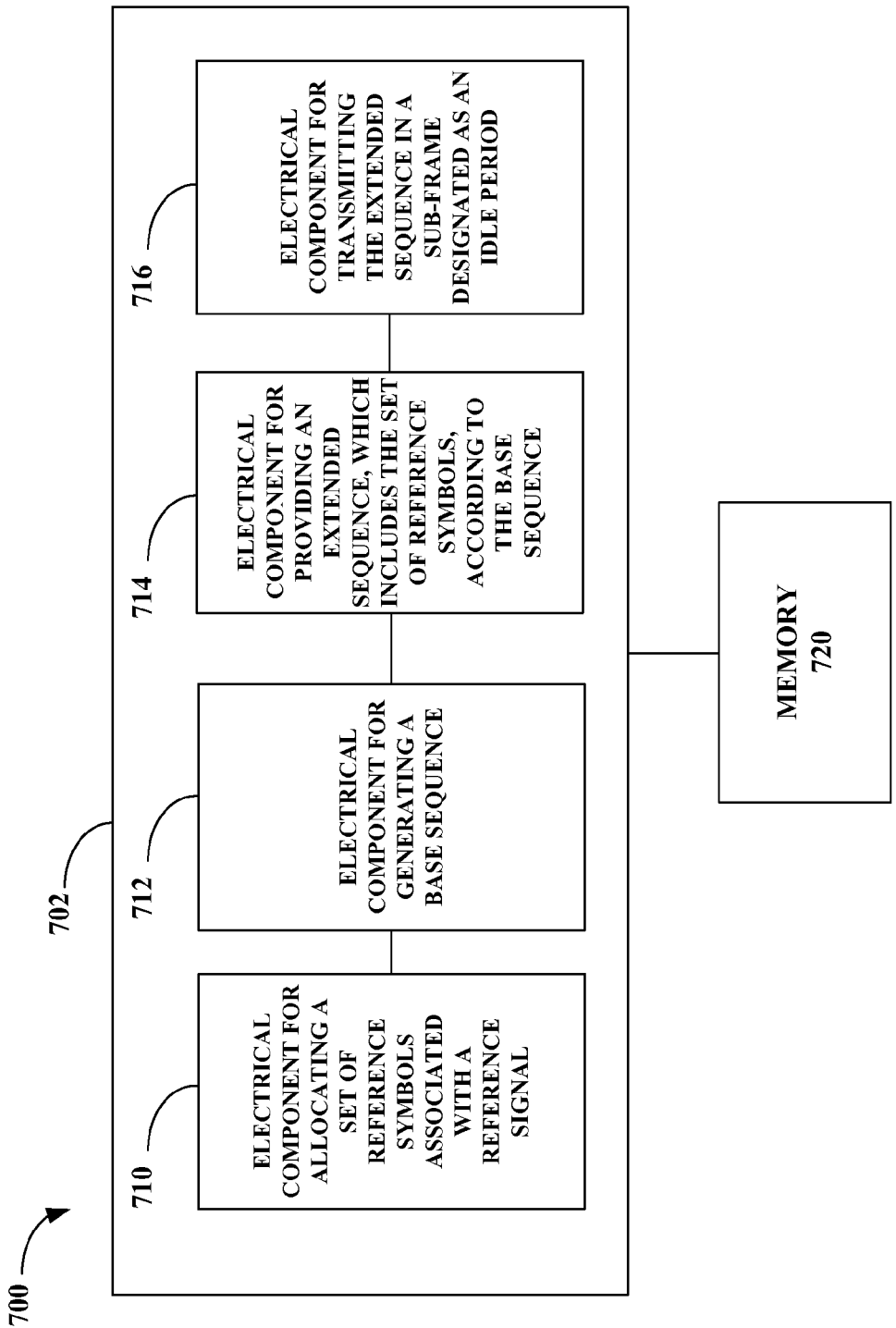
FIG. 7 is an illustration of an exemplary coupling of electrical components that effectuate sequencing positioning reference signals.

Turning to FIG. 7, illustrated is a system 700 that facilitates sequencing a positioning reference signal according to an embodiment. System 700 and/or instructions for implementing system 700 can reside within base station 600 or a computer-readable storage medium, for instance. As depicted, system 700 includes functional blocks that can represent functions implemented by a processor, software, or combination thereof (e.g., firmware). System 700 includes a logical grouping 702 of electrical components that can act in conjunction. As illustrated, logical grouping 702 can include an electrical component for allocating a set of reference symbols associated with a reference signal 710, as well as an electrical component for generating a base sequence 712. Logical grouping 702 can also include an electrical component for providing an extended sequence, which includes the set of reference symbols, according to the base sequence 714. Further, logical grouping 702 can include an electrical component for transmitting the extended sequence in a sub-frame designated as an idle period 716. Additionally, system 700 can include a memory 720 that retains instructions for executing functions associated with electrical components 710, 712, 714, and 716, wherein any of electrical components 710, 712, 714, and 716 can exist either within or outside memory 720.

Figure 8:
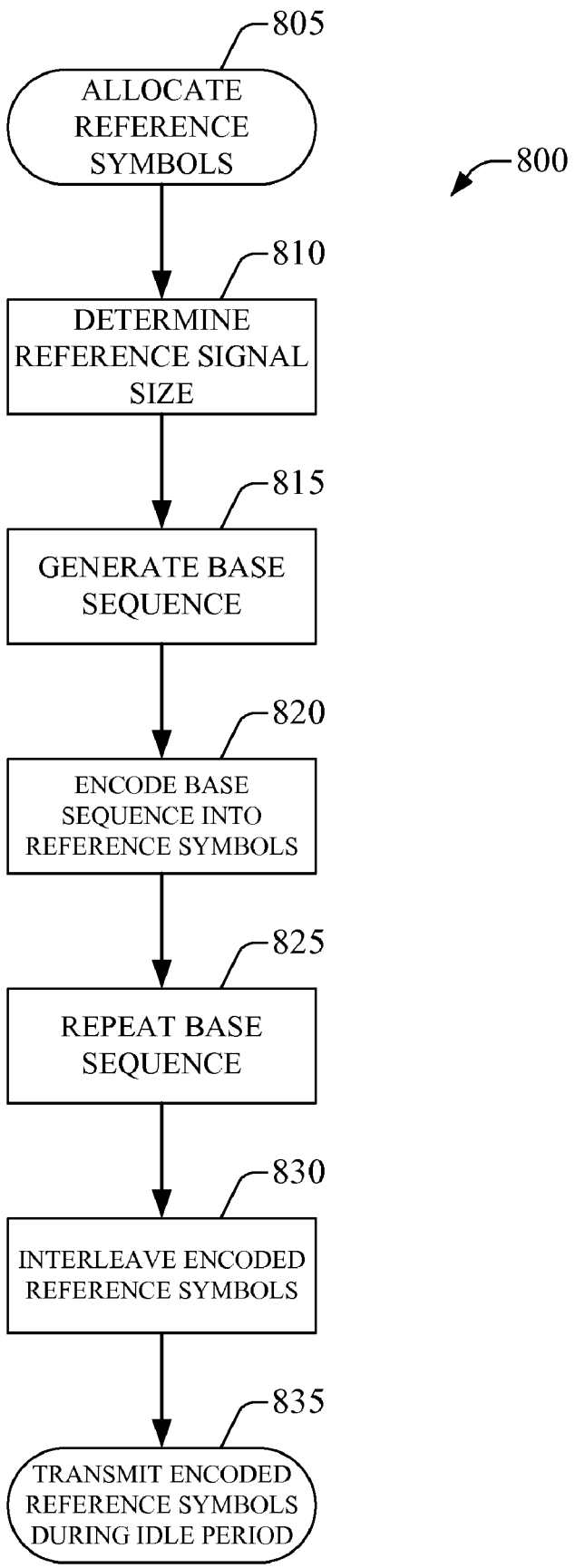
FIG. 8 is a flow chart illustrating an exemplary methodology for facilitating a sequencing of positioning reference signals in accordance with an aspect of the subject specification.

Referring next to FIG. 8, a flow chart illustrating an exemplary method for facilitating a sequencing of positioning reference signals is provided. As illustrated, process 800 includes a series of acts that may be performed by a base station according to an aspect of the subject specification. For instance, process 800 may be implemented by employing a processor to execute computer executable instructions stored on a computer readable storage medium to implement the series of acts. In another embodiment, a computer-readable storage medium comprising code for causing at least one computer to implement the acts of process 800 are contemplated.

In an aspect, process 800 begins with the allocation of a set of reference symbols corresponding to a reference signal at act 805. A size of the reference signal (e.g., number of reference symbols/elements) is then determined at act 810, followed by the generation of a base sequence at act 815. Here, although sequences of varying complexities can be utilized, a particular embodiment contemplates generating low-complexity sequences including, for example, Walsh sequences, maximum length sequences, or Zadoff-Chu sequences.

Next, at act 820, process 800 proceeds by encoding the base sequence into the reference symbols. It is noted, however, that the length of the base sequence is smaller than the size of the reference signal ascertained at act 810. Under such circumstances, it is contemplated that process 800 may proceed to act 825 where the base sequence is repeated until the entire reference signal is encoded.

It may also be desirable to interleave the encoded reference symbols. For this particular embodiment, the encoded reference symbols are thus interleaved at act 830. Moreover, the encoded reference symbols are interleaved into a time-frequency region designated for a positioning reference signal transmission. (See e.g., FIGS. 4-5). Process 800 then concludes at act 835 where the encoded reference symbols are transmitted during an idle period of the base station.

Figure 9:
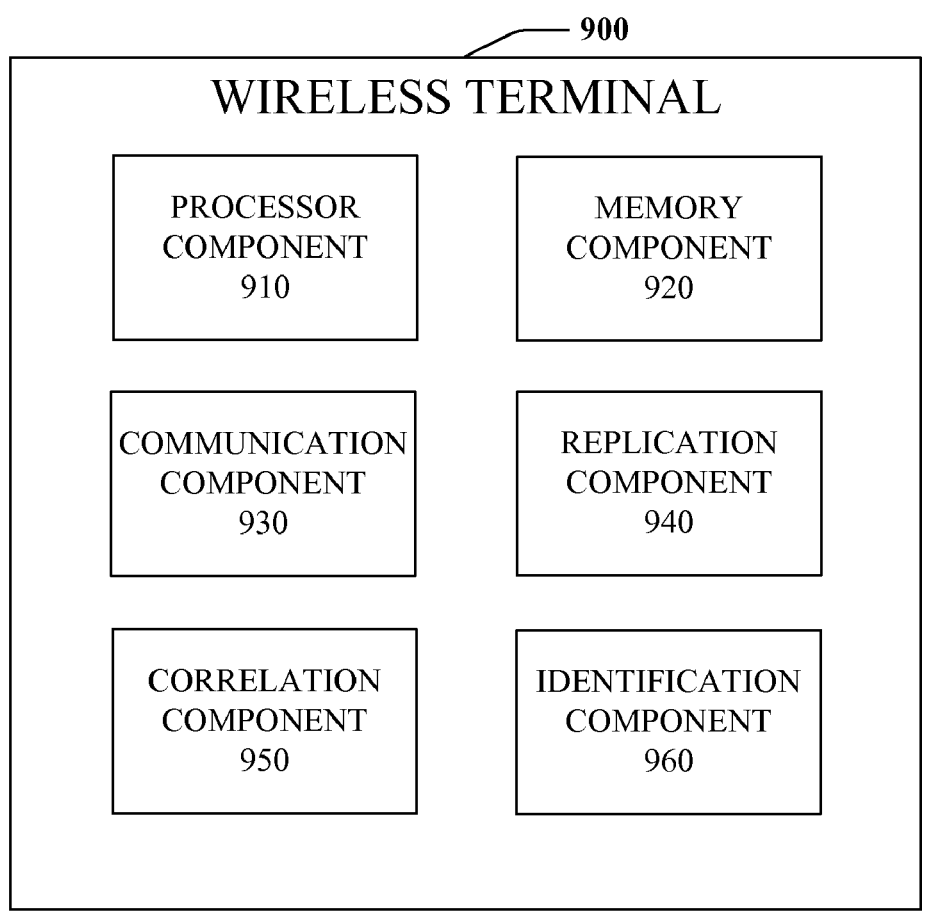
FIG. 9 illustrates a block diagram of an exemplary wireless terminal that facilitates correlating positioning reference signals in accordance with an aspect of the subject specification.

Referring next to FIG. 9, a block diagram illustrates an exemplary wireless terminal in accordance with various aspects. As illustrated, wireless terminal 900 may include processor component 910, memory component 920, communication component 930, replication component 940, correlation component 950, and identification component 960.

Similar to processor component 610 in base station 600, processor component 910 is configured to execute computer-readable instructions related to performing any of a plurality of functions. Processor component 910 can be a single processor or a plurality of processors dedicated to analyzing information to be communicated from wireless terminal 900 and/or generating information that can be utilized by memory component 920, communication component 930, replication component 940, correlation component 950, and/or identification component 960. Additionally or alternatively, processor component 910 may be configured to control one or more components of wireless terminal 900.

In another aspect, memory component 920 is coupled to processor component 910 and configured to store computer-readable instructions executed by processor component 910. Memory component 920 may also be configured to store any of a plurality of other types of data including data generated by any of communication component 930, replication component 940, correlation component 950, and/or identification component 960. Here, it should be noted that memory component 920 is analogous to memory component 620 in base station 600. Accordingly, it should be appreciated that any of the aforementioned features/configurations of memory component 620 are also applicable to memory component 920.

In yet another aspect, communication component 930 is also coupled to processor component 910 and configured to interface wireless terminal 900 with external entities. For instance, communication component 930 may be configured to obtain a sequence of reference symbols from a base station transmitted during the base station's idle period. In a particular embodiment, the idle period of the base station is associated with an enhanced idle period in downlink.

As illustrated, wireless terminal 900 may also include replication component 940 and correlation component 950. Within such embodiment, replication component 940 is configured to model a replicated sequence of reference symbols, whereas correlation component 950 is configured to determine a correlation between a subset of the received sequence and a corresponding subset of the replicated sequence. Here, it should be appreciated that either of the received sequence or the replicated sequence can be a time-domain sequence or a frequency-domain sequence. It should be further appreciated that either of the subset of the received sequence or the corresponding subset of the replicated sequence can be reference symbol subsets or reference element subsets.

In an aspect, processing the received sequence of symbols involves utilizing low-complexity algorithms. In a particular embodiment, wireless terminal 900 processes the received sequence by comparing transforms of the received sequence with transforms of the replicated sequence. For instance, correlation component 950 may be configured to ascertain a received transform set associated with the subset of the received sequence and a replicated transform set associated with the corresponding subset of the replicated sequence. Within such embodiment, the correlation ascertained by correlation component 950 is based on a comparison between the received transform set and the replicated transform set, wherein each of the received transform and the replicated transform may be a Fast Fourier Transform, for example. Correlation component 950 may also be configured to ascertain the transform sets by accessing a transform matrix, wherein the matrix can be stored locally and/or externally.

As illustrated, wireless terminal 900 further includes identification component 960. Within such embodiment, identification component 960 is configured to categorize the received sequence according to the correlation ascertained by correlation component 950. Here, it should be noted that identification component 960 can be configured to identify various types of sequences. In a particular embodiment, however, identification component 960 is configured to detect low-complexity sequences including, for example, a Walsh sequence, a maximum length sequence, or a Zadoff-Chu sequence.

Figure 10:
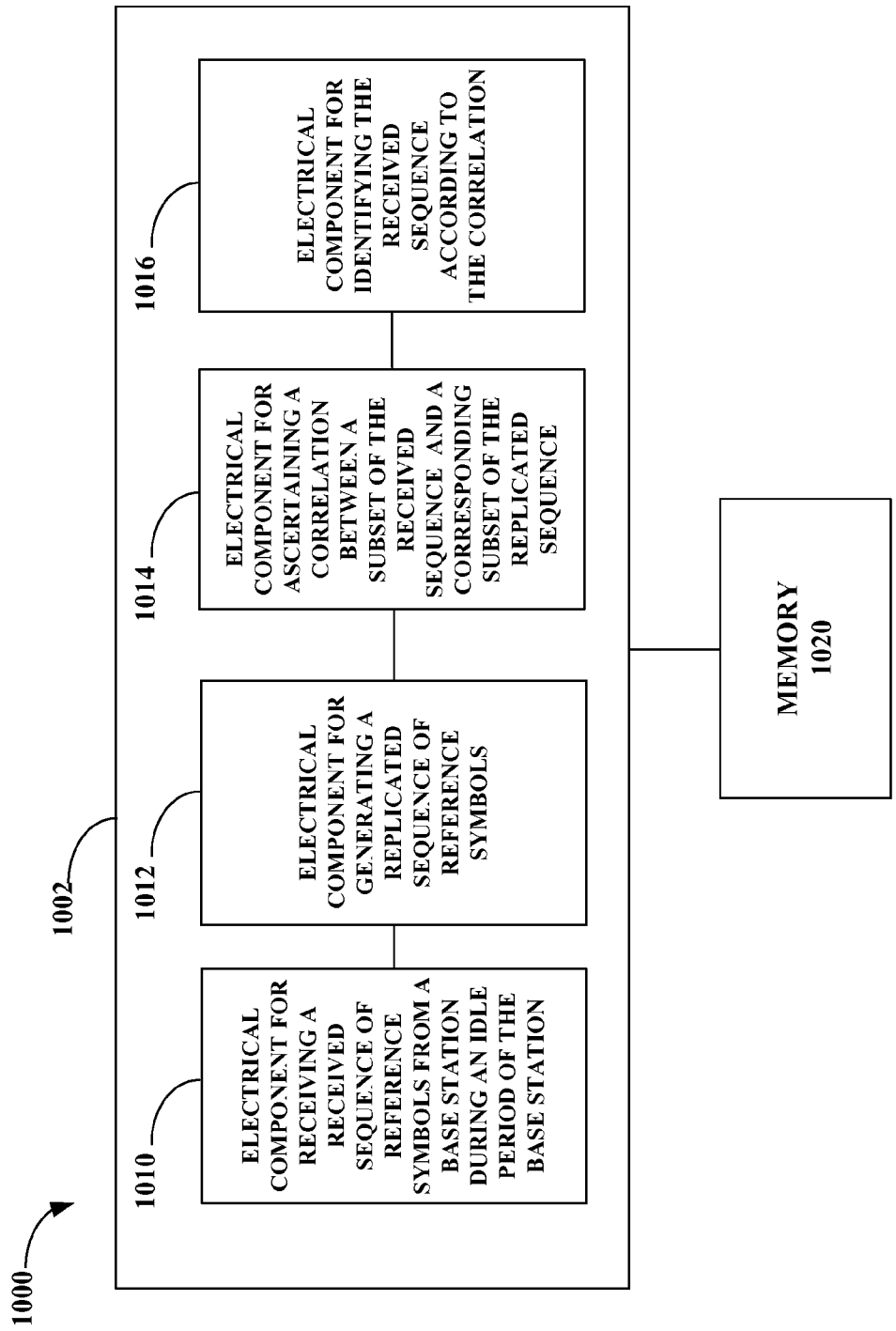
FIG. 10 is an illustration of an exemplary coupling of electrical components that effectuate correlating positioning reference signals.

Referring next to FIG. 10, illustrated is a system 1000 that facilitates correlating a positioning reference signal according to an embodiment. System 1000 and/or instructions for implementing system 1000 can reside within wireless terminal 900 or a computer-readable storage medium, for instance, wherein system 1000 includes functional blocks that can represent functions implemented by a processor, software, or combination thereof (e.g., firmware). Moreover, system 1000 includes a logical grouping 1002 of electrical components that can act in conjunction similar to logical grouping 702 in system 700. As illustrated, logical grouping 1002 can include an electrical component for receiving a received sequence of reference symbols from a base station during an idle period of the base station 1010, as well as an electrical component for generating a replicated sequence of reference symbols 1012. Logical grouping 1002 can also include an electrical component for ascertaining a correlation between a subset of the received sequence and a corresponding subset of the replicated sequence 1014. Further, logical grouping 1002 can include an electrical component for identifying the received sequence according to the correlation 1016. Additionally, system 1000 can include a memory 1020 that retains instructions for executing functions associated with electrical components 1010, 1012, 1014, and 1016. While shown as being external to memory 1020, it is to be understood that electrical components 1010, 1012, 1014, and 1016 can exist within memory 1020.

Figure 11:
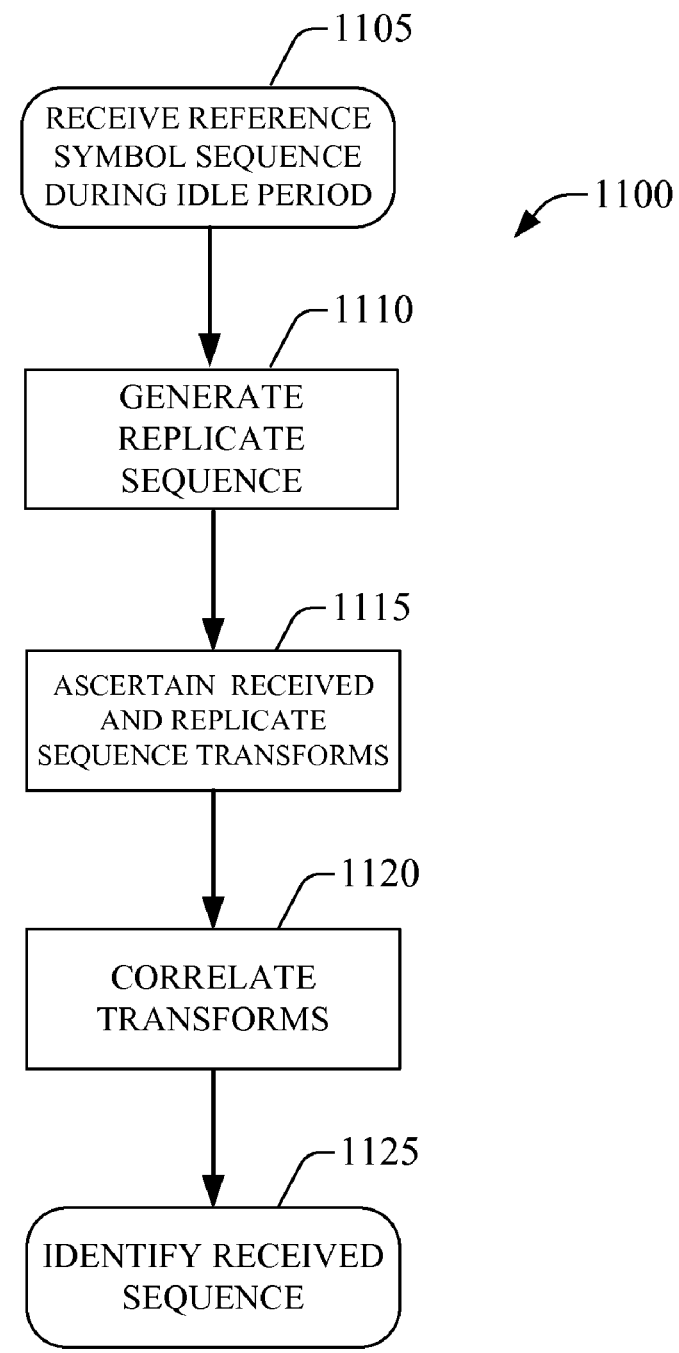
FIG. 11 is a flow chart illustrating an exemplary methodology that facilitates correlating positioning reference signals in accordance with a first aspect of the subject specification.

Referring next to FIG. 11, a flow chart illustrating an exemplary method for correlating a positioning reference signal is provided. As illustrated, process 1100 includes a series of acts that may be performed by a wireless terminal according to an aspect of the subject specification. For instance, process 1100 may be implemented by employing a processor to execute computer executable instructions stored on a computer readable storage medium to implement the series of acts. In another embodiment, a computer-readable storage medium comprising code for causing at least one computer to implement the acts of process 1100 are contemplated.

In an aspect, process 1100 begins with the wireless terminal receiving a sequence of reference symbols from a base station at act 1105, followed by the generation of a received sequence replica at act 1110. For this particular embodiment, it should be noted that the received sequence corresponds to a positioning reference signal transmitted by the base station. To facilitate efficient processing at the wireless terminal, it is contemplated that the received sequence is a low complexity sequence. In a particular embodiment, process 1100 determines transforms at act 1115 for corresponding subsets of the received and replicated sequences. For this embodiment, the transforms determined at act 1115 can then be correlated at act 1120, wherein the correlation between such transforms is indicative of a correlation between the received and replicated sequences. Process 1100 then concludes at act 1125 where the received sequence is identified based in part on the correlation ascertained at act 1120.

Exemplary Communication System

Figure 12:
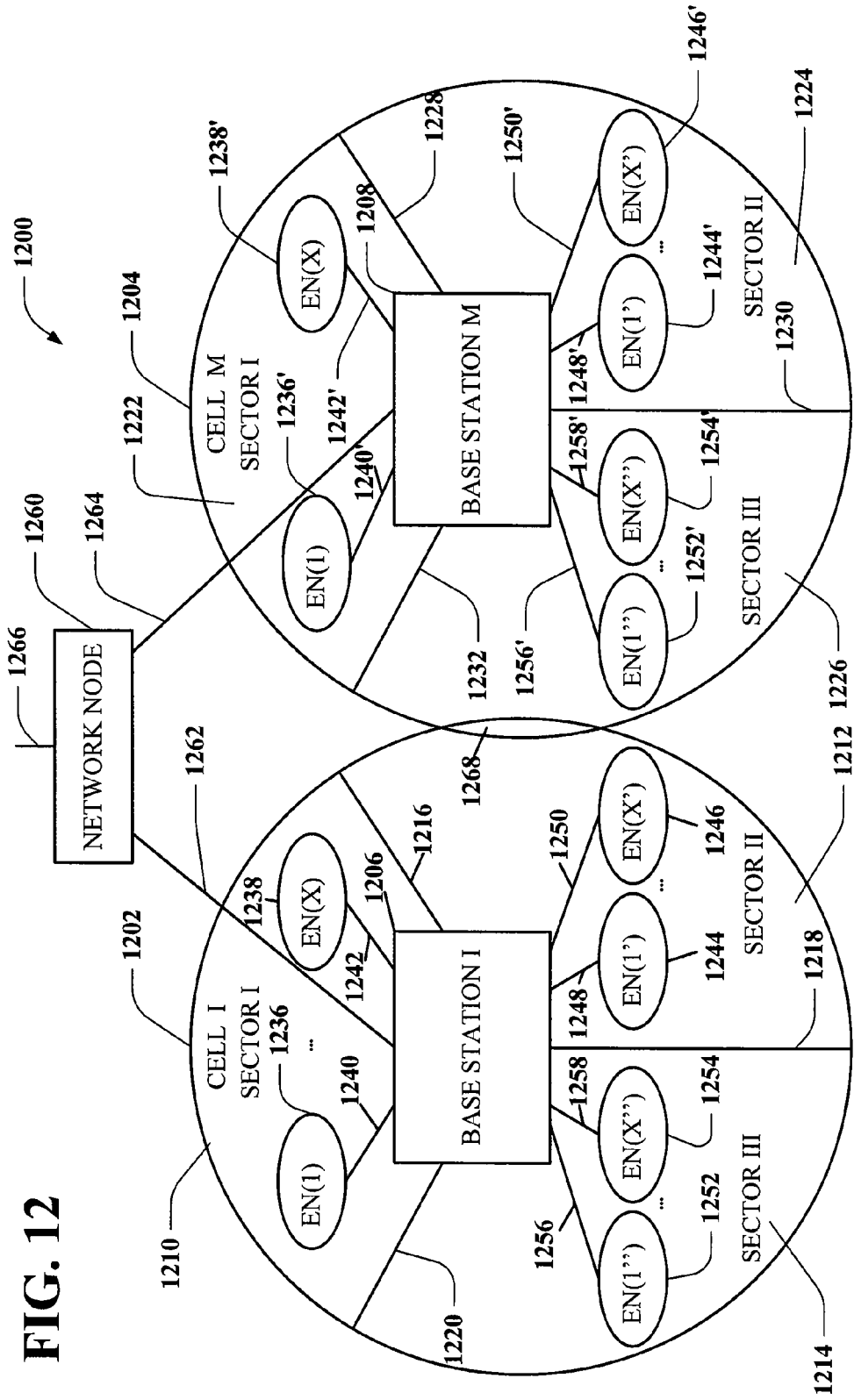
FIG. 12 is an illustration of an exemplary communication system implemented in accordance with various aspects including multiple cells.

Referring next to FIG. 12, an exemplary communication system 1200 implemented in accordance with various aspects is provided including multiple cells: cell I 1202, cell M 1204. Here, it should be noted that neighboring cells 1202, 1204 overlap slightly, as indicated by cell boundary region 1268, thereby creating potential for signal interference between signals transmitted by base stations in neighboring cells. Each cell 1202, 1204 of system 1200 includes three sectors. Cells which have not been subdivided into multiple sectors (N=1), cells with two sectors (N=2) and cells with more than 3 sectors (N>3) are also possible in accordance with various aspects. Cell 1202 includes a first sector, sector I 1210, a second sector, sector II 1212, and a third sector, sector III 1214. Each sector 1210, 1212, and 1214 has two sector boundary regions; each boundary region is shared between two adjacent sectors.

Sector boundary regions provide potential for signal interference between signals transmitted by base stations in neighboring sectors. Line 1216 represents a sector boundary region between sector I 1210 and sector II 1212; line 1218 represents a sector boundary region between sector II 1212 and sector III 1214; line 1220 represents a sector boundary region between sector III 1214 and sector 1 1210. Similarly, cell M 1204 includes a first sector, sector I 1222, a second sector, sector II 1224, and a third sector, sector III 1226. Line 1228 represents a sector boundary region between sector I 1222 and sector II 1224; line 1230 represents a sector boundary region between sector II 1224 and sector III 1226; line 1232 represents a boundary region between sector III 1226 and sector I 1222. Cell I 1202 includes a base station (BS), base station I 1206, and a plurality of end nodes (ENs) in each sector 1210, 1212, 1214. Sector I 1210 includes EN(1) 1236 and EN(X) 1238 coupled to BS 1206 via wireless links 1240, 1242, respectively; sector II 1212 includes EN(1') 1244 and EN(X') 1246 coupled to BS 1206 via wireless links 1248, 1250, respectively; sector III 1214 includes EN(1") 1252 and EN(X") 1254 coupled to BS 1206 via wireless links 1256, 1258, respectively. Similarly, cell M 1204 includes base station M 1208, and a plurality of end nodes (ENs) in each sector 1222, 1224, and 1226. Sector I 1222 includes EN(1) 1236' and EN(X) 1238' coupled to BS M 1208 via wireless links 1240', 1242', respectively; sector II 1224 includes EN(1') 1244' and EN(X') 1246' coupled to BS M 1208 via wireless links 1248', 1250', respectively; sector 3 1226 includes EN(1") 1252' and EN(X") 1254' coupled to BS 1208 via wireless links 1256', 1258', respectively.

System 1200 also includes a network node 1260 which is coupled to BS I 1206 and BS M 1208 via network links 1262, 1264, respectively. Network node 1260 is also coupled to other network nodes, e.g., other base stations, AAA server nodes, intermediate nodes, routers, etc. and the Internet via network link 1266. Network links 1262, 1264, 1266 may be, e.g., fiber optic cables. Each end node, e.g. EN 1 1236 may be a wireless terminal including a transmitter as well as a receiver. The wireless terminals, e.g., EN(1) 1236 may move through system 1200 and may communicate via wireless links with the base station in the cell in which the EN is currently located. The wireless terminals, (WTs), e.g. EN(1) 1236, may communicate with peer nodes, e.g., other WTs in system 1200 or outside system 1200 via a base station, e.g. BS 1206, and/or network node 1260. WTs, e.g., EN(1) 1236 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 13:
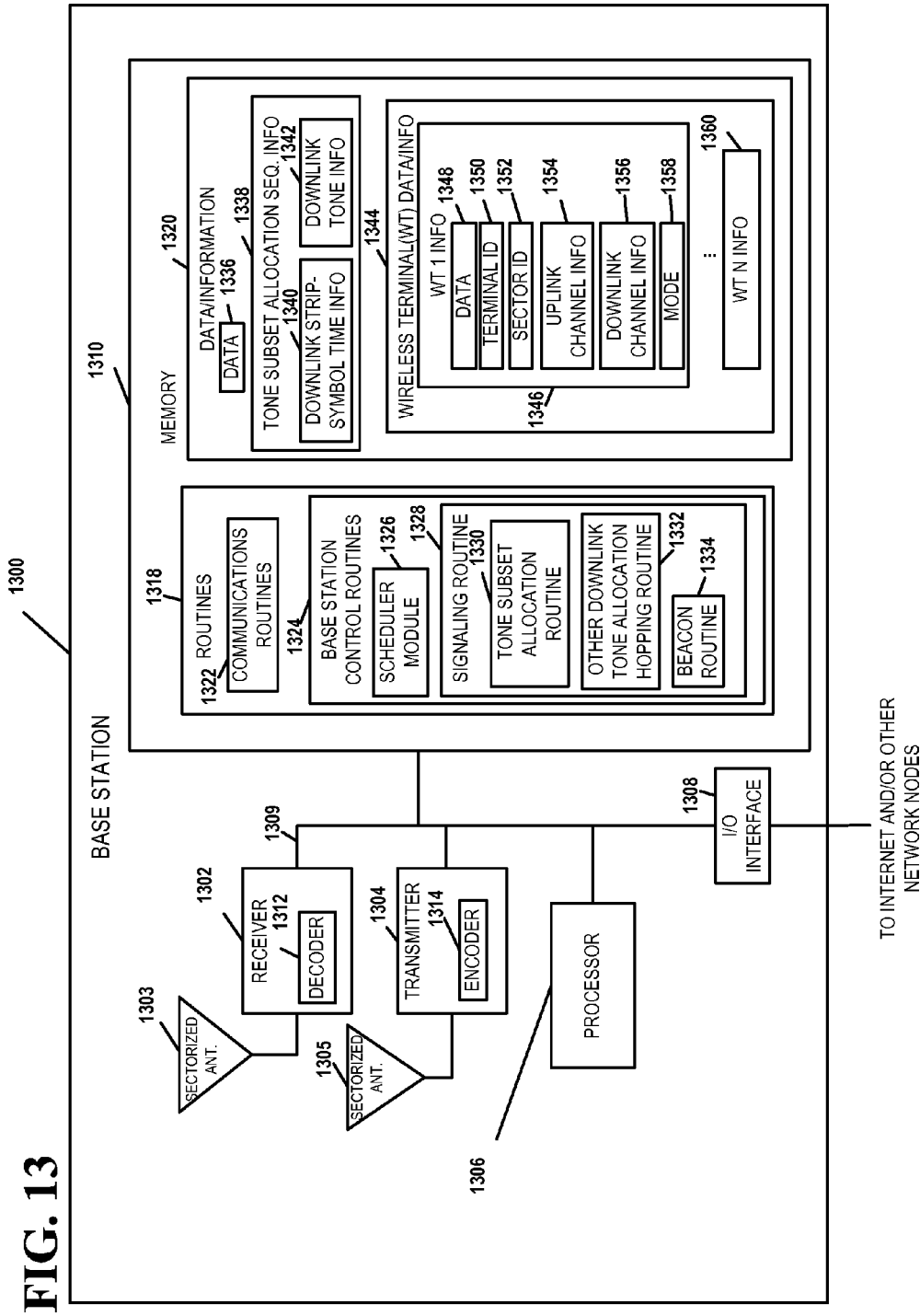
FIG. 13 is an illustration of an exemplary base station in accordance with various aspects described herein.

FIG. 13 illustrates an exemplary base station 1300 in accordance with various aspects. Base station 1300 implements tone subset allocation sequences, with different tone subset allocation sequences generated for respective different sector types of the cell. Base station 1300 may be used as any one of base stations 1206, 1208 of the system 1200 of FIG. 12. The base station 1300 includes a receiver 1302, a transmitter 1304, a processor 1306, e.g., CPU, an input/output interface 1308 and memory 1310 coupled together by a bus 1309 over which various elements 1302, 1304, 1306, 1308, and 1310 may interchange data and information.

Sectorized antenna 1303 coupled to receiver 1302 is used for receiving data and other signals, e.g., channel reports, from wireless terminals transmissions from each sector within the base station's cell. Sectorized antenna 1305 coupled to transmitter 1304 is used for transmitting data and other signals, e.g., control signals, pilot signal, beacon signals, etc. to wireless terminals 1400 (see FIG. 14) within each sector of the base station's cell. In various aspects, base station 1300 may employ multiple receivers 1302 and multiple transmitters 1304, e.g., an individual receivers 1302 for each sector and an individual transmitter 1304 for each sector. Processor 1306, may be, e.g., a general purpose central processing unit (CPU). Processor 1306 controls operation of base station 1300 under direction of one or more routines 1318 stored in memory 1310 and implements the methods. I/O interface 1308 provides a connection to other network nodes, coupling the BS 1300 to other base stations, access routers, AAA server nodes, etc., other networks, and the Internet. Memory 1310 includes routines 1318 and data/information 1320.

Data/information 1320 includes data 1336, tone subset allocation sequence information 1338 including downlink strip-symbol time information 1340 and downlink tone information 1342, and wireless terminal (WT) data/info 1344 including a plurality of sets of WT information: WT 1 info 1346 and WT N info 1360. Each set of WT info, e.g., WT 1 info 1346 includes data 1348, terminal ID 1350, sector ID 1352, uplink channel information 1354, downlink channel information 1356, and mode information 1358.

Routines 1318 include communications routines 1322 and base station control routines 1324. Base station control routines 1324 includes a scheduler module 1326 and signaling routines 1328 including a tone subset allocation routine 1330 for strip-symbol periods, other downlink tone allocation hopping routine 1332 for the rest of symbol periods, e.g., non strip-symbol periods, and a beacon routine 1334.

Data 1336 includes data to be transmitted that will be sent to encoder 1314 of transmitter 1304 for encoding prior to transmission to WTs, and received data from WTs that has been processed through decoder 1312 of receiver 1302 following reception. Downlink strip-symbol time information 1340 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1342 includes information including a carrier frequency assigned to the base station 1300, the number and frequency of tones, and the set of tone subsets to be allocated to the strip-symbol periods, and other cell and sector specific values such as slope, slope index and sector type.

Data 1348 may include data that WT1 1400 has received from a peer node, data that WT 1 1400 desires to be transmitted to a peer node, and downlink channel quality report feedback information. Terminal ID 1350 is a base station 1300 assigned ID that identifies WT 1 1400. Sector ID 1352 includes information identifying the sector in which WT1 1400 is operating. Sector ID 1352 can be used, for example, to determine the sector type. Uplink channel information 1354 includes information identifying channel segments that have been allocated by scheduler 1326 for WT1 1400 to use, e.g., uplink traffic channel segments for data, dedicated uplink control channels for requests, power control, timing control, etc. Each uplink channel assigned to WT1 1400 includes one or more logical tones, each logical tone following an uplink hopping sequence. Downlink channel information 1356 includes information identifying channel segments that have been allocated by scheduler 1326 to carry data and/or information to WT1 1400, e.g., downlink traffic channel segments for user data. Each downlink channel assigned to WT1 1400 includes one or more logical tones, each following a downlink hopping sequence. Mode information 1358 includes information identifying the state of operation of WT1 1400, e.g. sleep, hold, on.

Communications routines 1322 control the base station 1300 to perform various communications operations and implement various communications protocols. Base station control routines 1324 are used to control the base station 1300 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1328 controls the operation of receiver 1302 with its decoder 1312 and transmitter 1304 with its encoder 1314. The signaling routine 1328 is responsible controlling the generation of transmitted data 1336 and control information. Tone subset allocation routine 1330 constructs the tone subset to be used in a strip-symbol period using the method of the aspect and using data/info 1320 including downlink strip-symbol time info 1340 and sector ID 1352. The downlink tone subset allocation sequences will be different for each sector type in a cell and different for adjacent cells. The WTs 1400 receive the signals in the strip-symbol periods in accordance with the downlink tone subset allocation sequences; the base station 1300 uses the same downlink tone subset allocation sequences in order to generate the transmitted signals. Other downlink tone allocation hopping routine 1332 constructs downlink tone hopping sequences, using information including downlink tone information 1342, and downlink channel information 1356, for the symbol periods other than the strip-symbol periods. The downlink data tone hopping sequences are synchronized across the sectors of a cell. Beacon routine 1334 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 14:
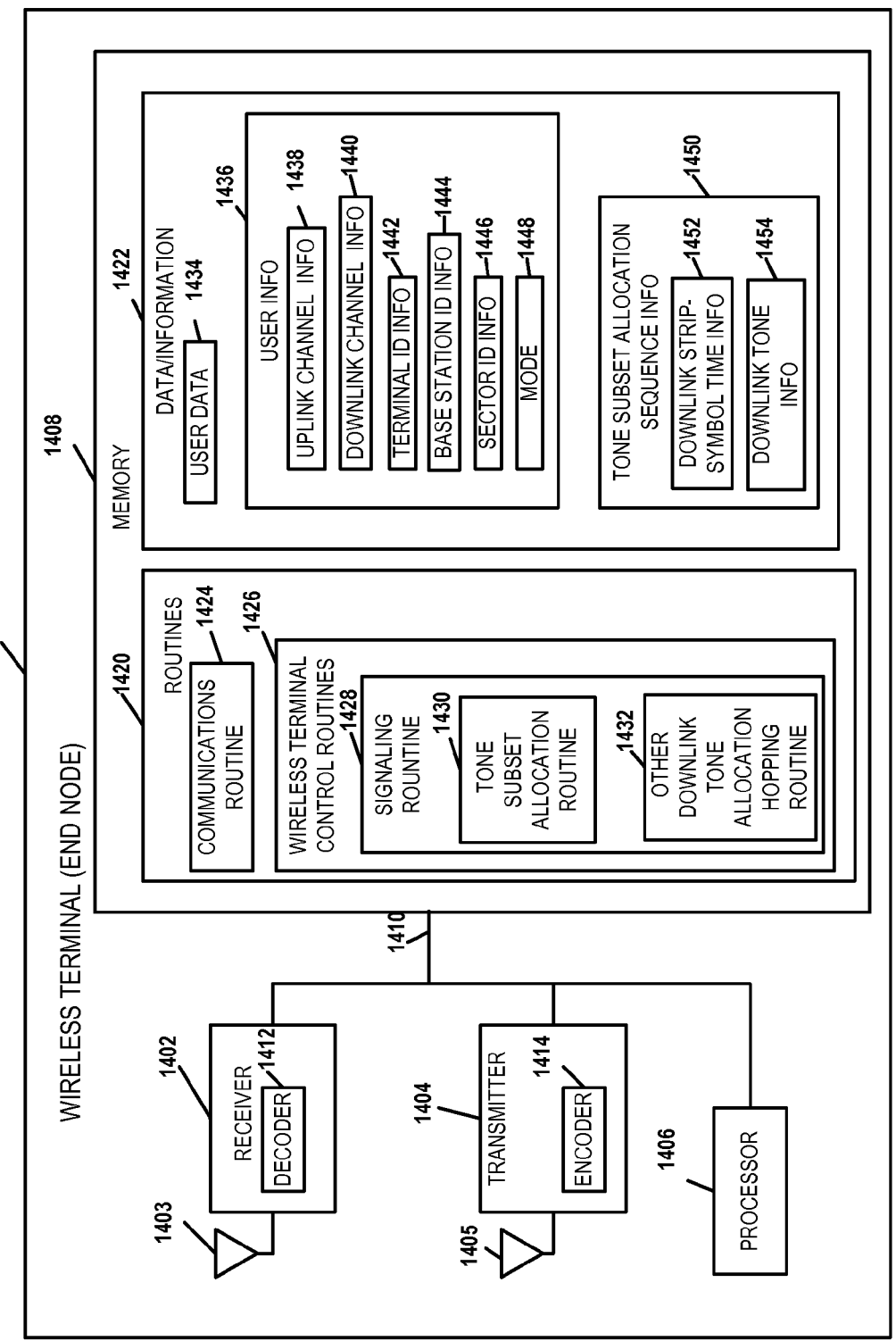
FIG. 14 is an illustration of an exemplary wireless terminal implemented in accordance with various aspects described herein.

FIG. 14 illustrates an exemplary wireless terminal (end node) 1400 which can be used as any one of the wireless terminals (end nodes), e.g., EN(1) 1236, of the system 1200 shown in FIG. 12. Wireless terminal 1400 implements the tone subset allocation sequences. The wireless terminal 1400 includes a receiver 1402 including a decoder 1412, a transmitter 1404 including an encoder 1414, a processor 1406, and memory 1408 which are coupled together by a bus 1410 over which the various elements 1402, 1404, 1406, 1408 can interchange data and information. An antenna 1403 used for receiving signals from a base station (and/or a disparate wireless terminal) is coupled to receiver 1402. An antenna 1405 used for transmitting signals, e.g., to a base station (and/or a disparate wireless terminal) is coupled to transmitter 1404.

The processor 1406, e.g., a CPU controls the operation of the wireless terminal 1400 and implements methods by executing routines 1420 and using data/information 1422 in memory 1408.

Data/information 1422 includes user data 1434, user information 1436, and tone subset allocation sequence information 1450. User data 1434 may include data, intended for a peer node, which will be routed to encoder 1414 for encoding prior to transmission by transmitter 1404 to a base station, and data received from the base station which has been processed by the decoder 1412 in receiver 1402. User information 1436 includes uplink channel information 1438, downlink channel information 1440, terminal ID information 1442, base station ID information 1444, sector ID information 1446, and mode information 1448. Uplink channel information 1438 includes information identifying uplink channels segments that have been assigned by a base station for wireless terminal 1400 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1440 includes information identifying downlink channel segments that have been assigned by a base station to WT 1400 for use when the base station is transmitting data/information to WT 1400. Downlink channels may include downlink traffic channels and assignment channels, each downlink channel including one or more logical tone, each logical tone following a downlink hopping sequence, which is synchronized between each sector of the cell.

User info 1436 also includes terminal ID information 1442, which is a base station-assigned identification, base station ID information 1444 which identifies the specific base station that WT has established communications with, and sector ID info 1446 which identifies the specific sector of the cell where WT 1400 is presently located. Base station ID 1444 provides a cell slope value and sector ID info 1446 provides a sector index type; the cell slope value and sector index type may be used to derive tone hopping sequences. Mode information 1448 also included in user info 1436 identifies whether the WT 1400 is in sleep mode, hold mode, or on mode.

Tone subset allocation sequence information 1450 includes downlink strip-symbol time information 1452 and downlink tone information 1454. Downlink strip-symbol time information 1452 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1454 includes information including a carrier frequency assigned to the base station, the number and frequency of tones, and the set of tone subsets to be allocated to the strip-symbol periods, and other cell and sector specific values such as slope, slope index and sector type.

Routines 1420 include communications routines 1424 and wireless terminal control routines 1426. Communications routines 1424 control the various communications protocols used by WT 1400. Wireless terminal control routines 1426 controls basic wireless terminal 1400 functionality including the control of the receiver 1402 and transmitter 1404. Wireless terminal control routines 1426 include the signaling routine 1428. The signaling routine 1428 includes a tone subset allocation routine 1430 for the strip-symbol periods and another downlink tone allocation hopping routine 1432 for the rest of symbol periods, e.g., non strip-symbol periods. Tone subset allocation routine 1430 uses user data/info 1422 including downlink channel information 1440, base station ID info 1444, e.g., slope index and sector type, and downlink tone information 1454 in order to generate the downlink tone subset allocation sequences in accordance with some aspects and process received data transmitted from the base station. Other downlink tone allocation hopping routine 1432 constructs downlink tone hopping sequences, using information including downlink tone information 1454, and downlink channel information 1440, for the symbol periods other than the strip-symbol periods. Tone subset allocation routine 1430, when executed by processor 1406, is used to determine when and on which tones the wireless terminal 1400 is to receive one or more strip-symbol signals from the base station 1300. The uplink tone allocation hopping routine 1432 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates correlating a positioning reference signal, comprising:
   receiving a received sequence of reference symbols from a base station during an idle period of the base station;
   generating a replicated sequence of reference symbols;
   ascertaining a correlation between a subset of the received sequence of reference symbols and a corresponding subset of the replicated sequence of reference symbols; and
   identifying the received sequence of reference symbols by type according to the correlation.

2. The method of claim 1, wherein the idle period of the base station is associated with an enhanced idle period in downlink.

3. The method of claim 1, wherein each of the subset of the received sequence of reference symbols and the corresponding subset of the replicated sequence of reference symbols are reference symbol subsets.

4. The method of claim 1, wherein each of the subset of the received sequence of reference symbols and the corresponding subset of the replicated sequence of reference symbols are reference element subsets.

5. The method of claim 1, the identifying comprising determining whether the received sequence of reference symbols is one of a Walsh sequence, a maximum length sequence, or a Zadoff-Chu sequence.

6. The method of claim 1, the ascertaining comprising determining a received transform set and a replicated transform set, the received transform set associated with the subset of the received sequence of reference symbols, the replicated transform set associated with the corresponding subset of the replicated sequence of reference symbols, the correlation based on a comparison between the received transform set and the replicated transform set.

7. The method of claim 6, wherein each of the received transform and the replicated transform is a Fast Fourier Transform.

8. The method of claim 6, the determining comprising accessing a transform matrix.

9. The method of claim 1, wherein each of the received sequence of reference symbols and the replicated sequence of reference symbols is a frequency-domain sequence.

10. The method of claim 1, wherein each of the received sequence of reference symbols and the replicated sequence of reference symbols is a time-domain sequence.

11. An apparatus configured to facilitate correlating a positioning reference signal, the apparatus comprising:
    a processor configured to execute computer executable components stored in memory, the components including:
       a communication component configured to receive a received sequence of reference symbols from a base station during an idle period of the base station;
       a replication component configured to model a replicated sequence of reference symbols;
       a correlation component configured to determine a correlation between a subset of the received sequence of reference symbols and a corresponding subset of the replicated sequence of reference symbols; and
       an identification component configured to categorize the received sequence of reference symbols by type according to the correlation.

12. The apparatus of claim 11, wherein the idle period of the base station is associated with an enhanced idle period in downlink.

13. The apparatus of claim 11, wherein each of the subset of the received sequence of reference symbols and the corresponding subset of the replicated sequence of reference symbols are reference symbol subsets.

14. The apparatus of claim 11, wherein each of the subset of the received sequence of reference symbols and the corresponding subset of the replicated sequence of reference symbols are reference element subsets.

15. The apparatus of claim 11, the identification component configured to ascertain whether the received sequence of reference symbols is one of a Walsh sequence, a maximum length sequence, or a Zadoff-Chu sequence.

16. The apparatus of claim 11, the correlation component configured to ascertain a received transform set and a replicated transform set, the received transform set associated with the subset of the received sequence of reference symbols, the replicated transform set associated with the corresponding subset of the replicated sequence of reference symbols, the correlation based on a comparison between the received transform set and the replicated transform set.

17. The apparatus of claim 16, wherein each of the received transform and the replicated transform is a Fast Fourier Transform.

18. The apparatus of claim 16, the correlation component configured to ascertain the received transform set and the replicated transform set by accessing a transform matrix.

19. The apparatus of claim 11, wherein each of the received sequence of reference symbols and the replicated sequence of reference symbols is a frequency-domain sequence.

20. The apparatus of claim 11, wherein each of the received sequence of reference symbols and the replicated sequence of reference symbols is a time-domain sequence.

21. A computer program product that facilitates correlating a positioning reference signal, comprising:
a non-transitory computer-readable storage medium comprising code for causing at least one computer to:
obtain a received sequence of reference symbols from a base station during an idle period of the base station;
provide a replicated sequence of reference symbols;
determine a correlation between a subset of the received sequence of reference symbols and a corresponding subset of the replicated sequence of reference symbols; and
identify the received sequence of reference symbols by type according to the correlation.

22. The computer program product of claim 21, wherein each of the subset of the received sequence of reference symbols and the corresponding subset of the replicated sequence of reference symbols are reference symbol subsets.

23. The computer program product of claim 21, wherein each of the subset of the received sequence of reference symbols and the corresponding subset of the replicated sequence of reference symbols are reference element subsets.

24. The computer program product of claim 21, the code further causing the at least one computer to ascertain whether the received sequence of reference symbols is one of a Walsh sequence, a maximum length sequence, or a Zadoff-Chu sequence.

25. An apparatus configured to facilitate correlating a positioning reference signal, the apparatus comprising:
means for receiving a received sequence of reference symbols from a base station during an idle period of the base station;
means for ascertaining a replicated sequence of reference symbols;
means for determining a correlation between a subset of the received sequence of reference symbols and a corresponding subset of the replicated sequence of reference symbols; and
means for recognizing the received sequence of reference symbols by type according to the correlation.

26. The apparatus of claim 25, further comprising means for obtaining a received transform set and a replicated transform set, the received transform set associated with the subset of the received sequence of reference symbols, the replicated transform set associated with the corresponding subset of the replicated sequence of reference symbols, the correlation based on a comparison between the received transform set and the replicated transform set.

27. The apparatus of claim 25, wherein each of the received sequence of reference symbols and the replicated sequence of reference symbols is a frequency-domain sequence.

28. The apparatus of claim 25, wherein each of the received sequence of reference symbols and the replicated sequence of reference symbols is a time-domain sequence.

* * * * *